(12) United States Patent
Haeggberg

(10) Patent No.: US 6,851,693 B2
(45) Date of Patent: Feb. 8, 2005

(54) STROLLER TRAILER

(75) Inventor: Christrian Haeggberg, Bazenheid (CH)

(73) Assignee: Lamprecht AG, Zurich (CH)

( * ) Notice: Subject to any disclaimer, the term of this patent is extended or adjusted under 35 U.S.C. 154(b) by 26 days.

(21) Appl. No.: 10/198,744

(22) Filed: Jul. 19, 2002

(65) Prior Publication Data

US 2003/0025304 A1 Feb. 6, 2003

(30) Foreign Application Priority Data

Jul. 20, 2001 (EP) .............................................. 01117499

(51) Int. Cl.⁷ .............................................. B62K 27/00
(52) U.S. Cl. ....................... 280/204; 280/647; 280/656; 280/650
(58) Field of Search ................................ 280/204, 642, 280/644, 647, 650, 639, 657, 658, 401, 1.5, 292, 47.38, 47.135, 47.25, 47.28, 47.331, 47.4, 47.41, 87.041, 654, 656, 43.1, 43.13, 648, 246, 400, 403, 404, 406.2, 407, 408, 411.1, 414.5, 415.1, 416.1, 416.3, 417.1, 418, 418.1, 419

(56) References Cited

U.S. PATENT DOCUMENTS

| | | | | | |
|---|---|---|---|---|---|
| 3,887,208 | A | * | 6/1975 | Vidal | 280/648 |
| 5,064,209 | A | * | 11/1991 | Kurschat | 280/204 |
| 5,067,738 | A | * | 11/1991 | O'Connor | 280/204 |
| 5,269,548 | A | * | 12/1993 | Milligan | 280/204 |
| 5,421,597 | A | * | 6/1995 | Berner | 280/204 |
| 5,470,088 | A | * | 11/1995 | Adams | 280/204 |
| 5,513,868 | A | * | 5/1996 | Barr | 280/400 |
| 5,785,335 | A | * | 7/1998 | George | 280/204 |

FOREIGN PATENT DOCUMENTS

EP    0911251    10/1997

* cited by examiner

Primary Examiner—Hau Phan
(74) Attorney, Agent, or Firm—Shoemaker and Mattare

(57) ABSTRACT

This invention refers to a trailer, designed to transport at least one child, which can be attached to a stroller and which is equipped with a chassis with at least one wheel, a frame and an attachment assembly for securing the trailer to the stroller, and which is designed so that the trailer is connected to the frame of the stroller, is equipped with a seat, and is fitted with at least one handle, at least one foot rest and a coupling device consisting of an attachment assembly and a first and a second joint.

11 Claims, 8 Drawing Sheets

STROLLER TRAILER

BACKGROUND OF THE INVENTION

This invention is a trailer designed to carry at least one child, which can be attached to a stroller and/or a handle and which is fitted with a chassis with at least one wheel, a frame and an attachment assembly for attaching the trailer to the stroller.

Trailers designed to carry at least one child which are attached to strollers or baby carriages are already a familiar sight to most people. European patent application EP 0 911 251 A1, for example, refers to such a trailer.

This is a stroller trailer, which can be mounted on a stroller and which is fitted with a platform to which a chassis with two wheels is attached together with a coupling device for connecting the trailer to a stroller wheel axle. A child is able to travel with the stroller while standing on this platform.

The platform of the stroller trailer is not suitable for sitting on due to the restricted size and the low seated position. The trailer with platform is pulled behind the stroller, being attached centrally. The seated position would be advantageous compared to the standing position as the child could then be carried without becoming tired. In addition, there is less risk of a child in the seated position falling off the trailer and injuring itself.

The trailer makes it more difficult to maneuver the stroller as the trailer and platform intrude into the leg space of the person pushing the stroller, both with and without a child, making walking more difficult.

SUMMARY OF THE INVENTION

The fundamental purpose of this invention is to avoid the aforementioned disadvantages, and thus in particular to realize a stroller trailer with a seating arrangement for at least one child.

Furthermore, maneuvering the stroller when the trailer is attached, but without a child standing on it, should be more convenient.

This task is solved by taking a trailer of the type mentioned at the beginning of this application, which can be attached to the frame of the stroller, and which is fitted with a seat, and which is designed with at least one handle;

at least one foot rest, and with a coupling device with an attachment device which allows the trailer to swing in at least two directions in relation to the stroller, and which in particular comprises a first and a second joint.

This invention is characterized by the fact that essentially the trailer can be mounted in a vertical position, i.e. in a position in which the child is able to sit upright.

The design of the frame of the trailer can vary, e.g. it can be designed as a single piece wooden or plastic frame, or by using steel tubing similar to a bicycle frame.

A ball joint, similar to those used on bicycle trailers, or any other universal or cardanic joint can be used instead of the two joints.

The handle grip and the seat are located in a superimposed position in relation to the chassis so that the child can be carried while sitting comfortably in an upright position. In order to allow a comfortable seated position, the connecting line in the assembly position between the chassis and the handle grip runs at an angle opposed to the vertical axis of less than 45°, preferably between 35–45°.

In order to realize a comfortable seated position, the position of the seat is preferably equal to half of the overall height of the trailer. It would be extremely advantageous if the height of the seat could be adjusted in order to accommodate children of varying heights.

The length of the seat is designed to accommodate at least one child. However, it is feasible that the length of the seat could be designed to accommodate two children.

The handle grip for keeping a firm hold while traveling is located at top end of the trailer. It can be designed to allow the height to be adjusted to accommodate children of varying sizes. The mounting device is advantageously designed in a position above the height of the seat. It can be located at a height approximately equivalent to, or greater than, the height of the handle.

A foot rest is provided at the bottom end of the trailer. It can be designed so that it is either permanently fixed into position or so that the height can be adjusted to accommodate children of varying heights.

A further design of the inventor's trailer can integrate this rest as an extension of the wheel axle.

A mounting device, which is attached to at least one frame element of the stroller, is used to secure the trailer seat. This mounting device is preferably designed as a quick-action locking device. This allows the mounting device to be removed rapidly, e.g. when the stroller needs to be folded.

The coupling device for connecting the trailer to the stroller can be attached to the stroller so that the trailer is pulled laterally behind the stroller.

The stroller can be maneuvered more easily due to the fact that the side installation of the trailer behind the stroller means that it does not intrude into the leg area of the person pushing the stroller.

The trailer could also be attached centrally.

The first joint of the coupling device allows the trailer seat to be swivelled vertically in relation to the direction of movement of the stroller. This allows for compensation of uneven surfaces.

The pivot point of the joint is on the side of the coupling device aligned with the stroller.

A return spring has proved to be advantageous when raising the trailer seat when unoccupied, thus making it easier to maneuver the stroller.

The second joint of the coupling device allows the trailer seat to move transversely to the direction of movement of the stroller.

This movement allows the trailer seat to be swivelled out in front of the stroller and parallel to the stroller. This allows the trailer to be transported easily when not in use and allows corners to be negotiated easily. A bracket is used to lock the trailer seat into the required transport position.

The pivot point of the joint is on the side of the coupling device facing the stroller.

The aforementioned designs allow at least one second child to be carried on the trailer in a seated position.

The attachment assembly for attaching the to the stroller can also be used to attach the trailer or its frame, respectively to a holder. Such a holder allows e.g. an adult person to hold the stroller and draw it with the child without any connection to the stroller.

Also, the trailer may comprise one or more front-wheels connected or connectable to the frame. Particularly in connection with the holder, the trailer may be used separately to draw a child. Trailer, holder and front-wheel assembly may be combined in a trailer kit to be combined by the user depending on the desired kind of use.

BRIEF DESCRIPTION OF THE DRAWINGS

The invention is described in more detail below with a drawing. These illustrations show the following details.

DESCRIPTION OF THE PREFERRED EMBODIMENT

Figure 1:
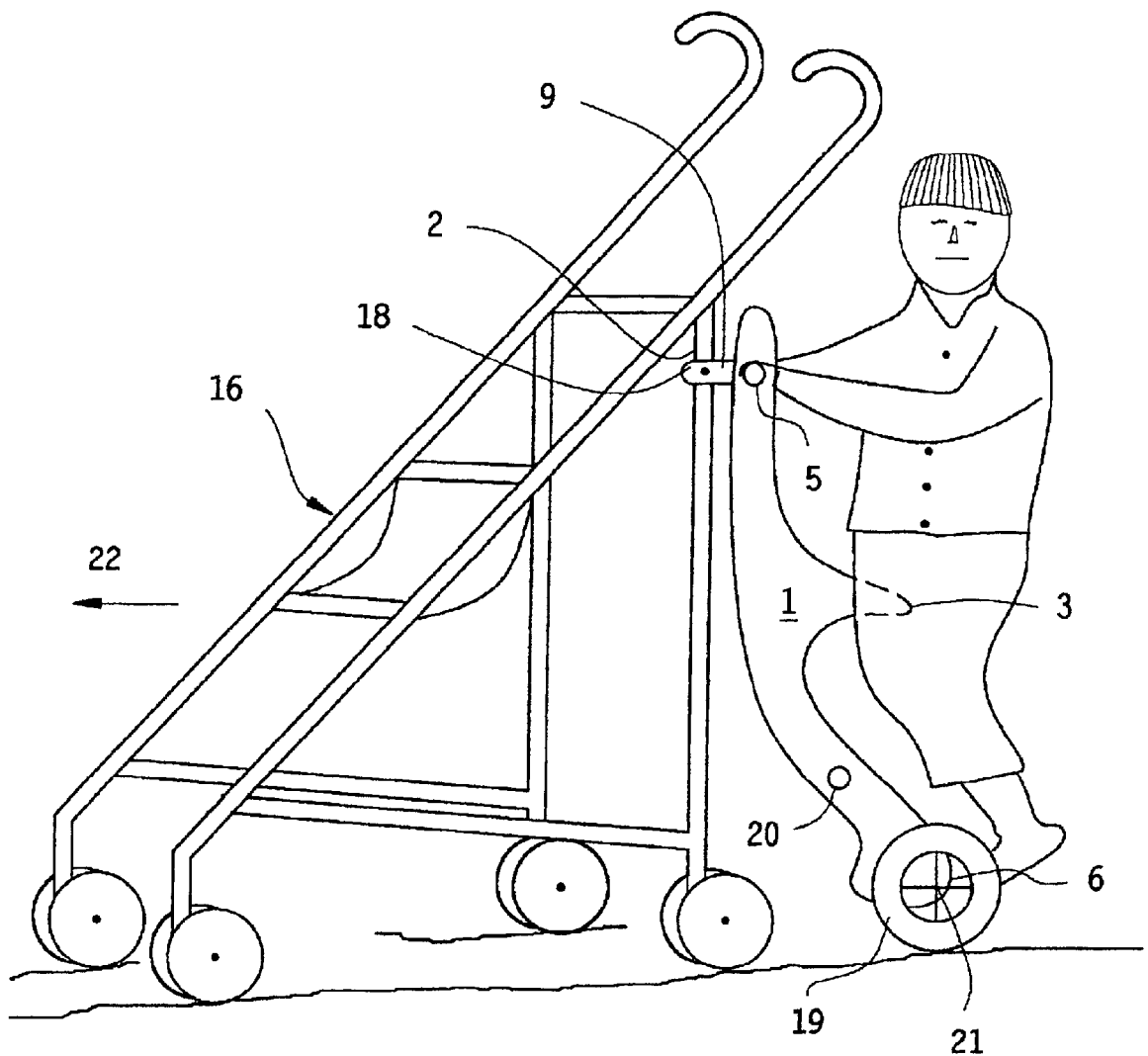
FIG. 1 is a view of the invented trailer in the lateral perspective.

FIG. 1 shows a schematic illustration in the lateral perspective of a sample design for a stroller trailer for carrying at least one child in a seated position, which can be attached to a stroller 16 and which has a chassis 6 with at least one wheel 19, one frame 1 and one attachment assembly 18 for attaching the trailer to a stroller 16.

The trailer is fitted with one seat 3, one handle 5, one foot rest 20, one wheel 19 and one coupling device 9. The seat 3 preferably inclines inwards and is designed to face in an opposed position to the direction of travel 22 of the stroller 16. The seat 3 is preferably designed longitudinally and accommodates one child. The design could be adapted to form a tandem seat for two children.

Figure 5:
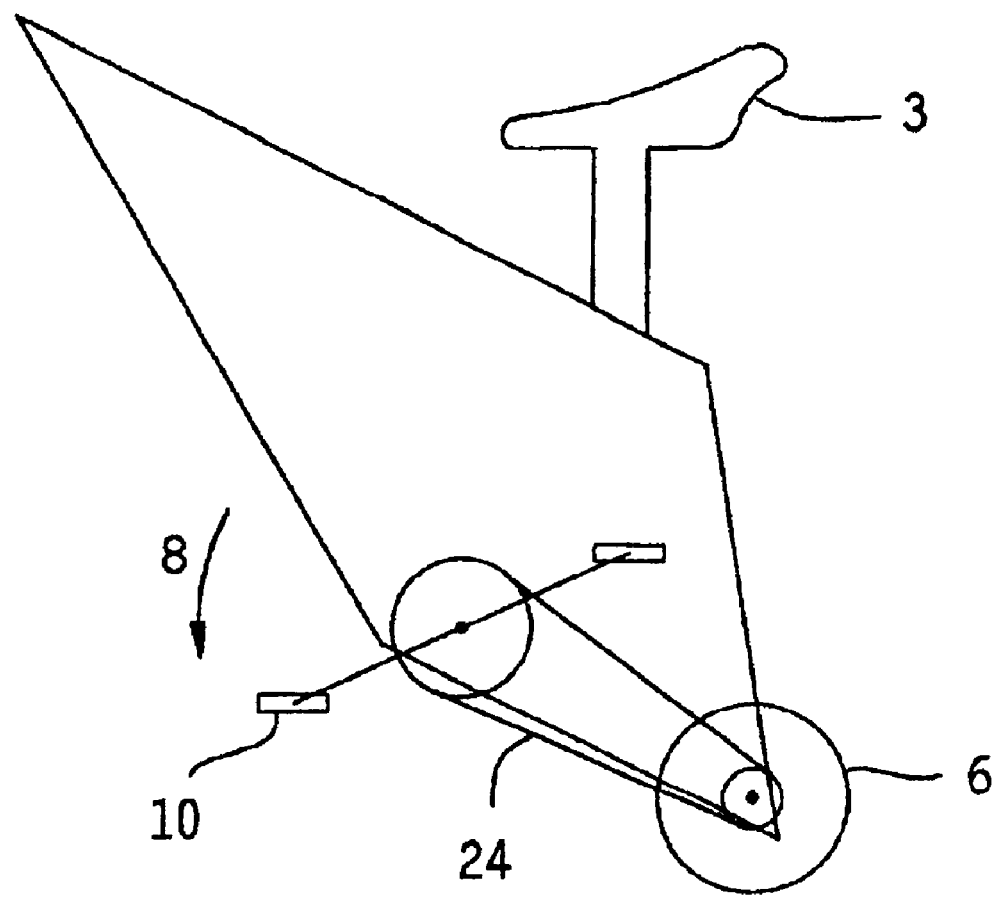
FIG. 5 shows an alternative design for the foot rest and the seat.

FIG. 5 shows a further design variant with a broader seat 3 in the form of a bicycle saddle. With this design variant, the foot rests are designed as pedals 10 which can be moved in a rotating movement 8 and which are connected to the chassis 6 by a chain 24.

Figure 4:
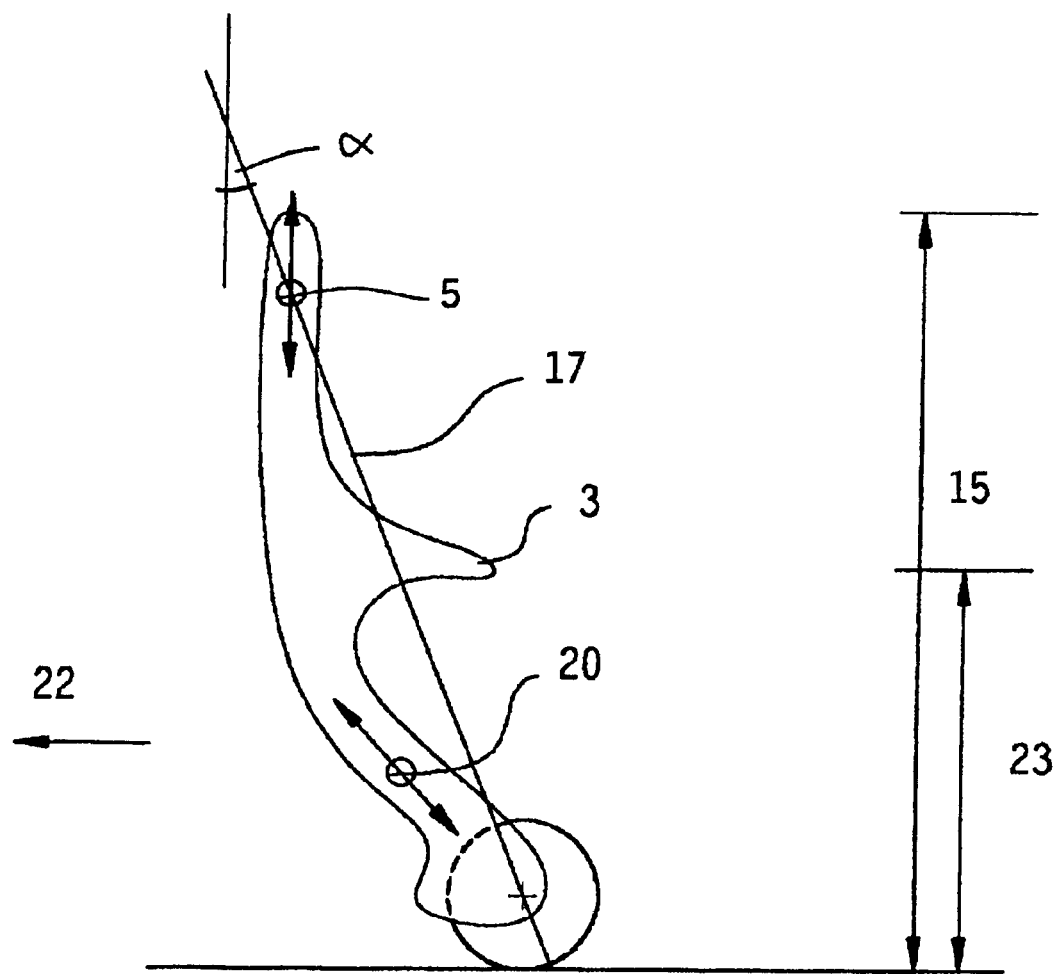
FIG. 4 is a schematic illustration of the seat position and the positions of the handle and foot rest.

The height 23 of the seat 3 in FIG. 1 and FIG. 4 corresponds approximately to half of the overall height 15 of the trailer. The handle 5 is located at the top end of the trailer and the foot rests 20 are located at the bottom end. The height of both the handle 5 as well as the foot rests 20 can be preferably adjusted in the direction indicated by the arrow in order to ensure an ideal seating position for children of varying sizes. Instead of being able to adjust the height of the handle 5 and the foot rest 20, it could be possible to adjust the height of the seat 3.

The layout of the seat 3, handle 5 and foot rests 20 is shown in FIG. 4. The handle 5 is positioned in the direction of travel 22 of the stroller 16 in front of the chassis 6 so that the connecting line 17 runs between the chassis 6 and the handle 5 at an angle a in the vertical perspective of less than 45°. This layout of the seat 3, handle 5 and foot rests 20 allows an upright seated position.

Figure 2:
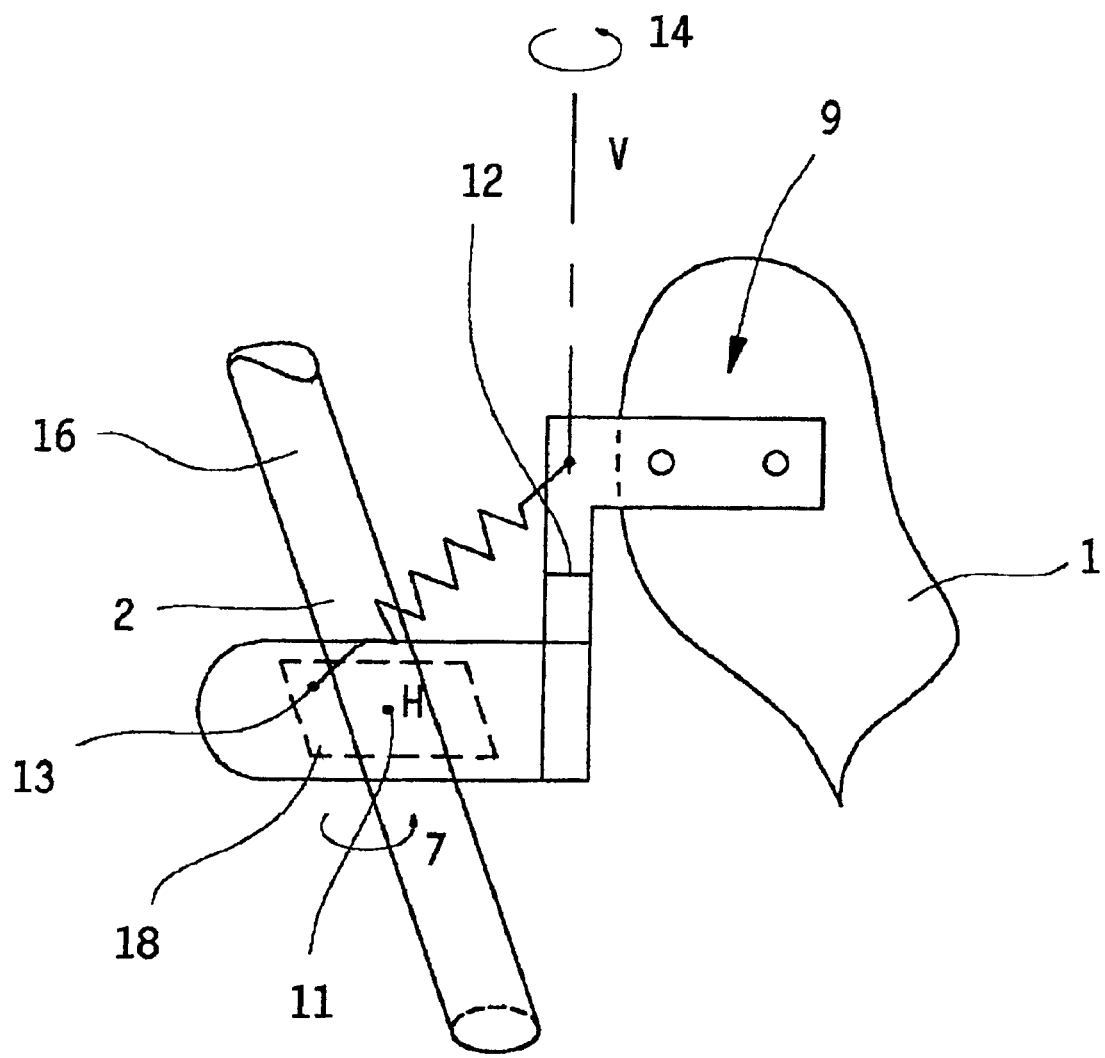
FIG. 2 is a view of the coupling device with the first and second joint.

The coupling devices 9 serves to connect a stroller trailer to a stroller 16. The coupling device 9 illustrated in FIG. 2 comprises a mounting device 18 and a first and a second joint (11 resp. 12).

The trailer attached to at least one frame element 2 of the stroller 16 with the aid of the attachment assembly 18. This attachment assembly 18 is preferably designed as a quick-action locking device.

The first joint 11 of the coupling device 9 allows a swivel movement 7 to be made on the horizontal axis H in the direction of the stroller trailer. This movement serves to compensate for uneven surfaces.

The pivot point of the first joint 11 is preferably on the side of the coupling device 9 facing the stroller 16. Easy maneuvering of the stroller trailer when not in use, and therefore not loaded, is made possible by a return spring 13, which raises the trailer.

The second joint 12 of the coupling device 9 allows the trailer seat to be moved 14 along a vertical axis V in both directions transversely to the direction of movement 22 of the stroller 16.

Figure 3:
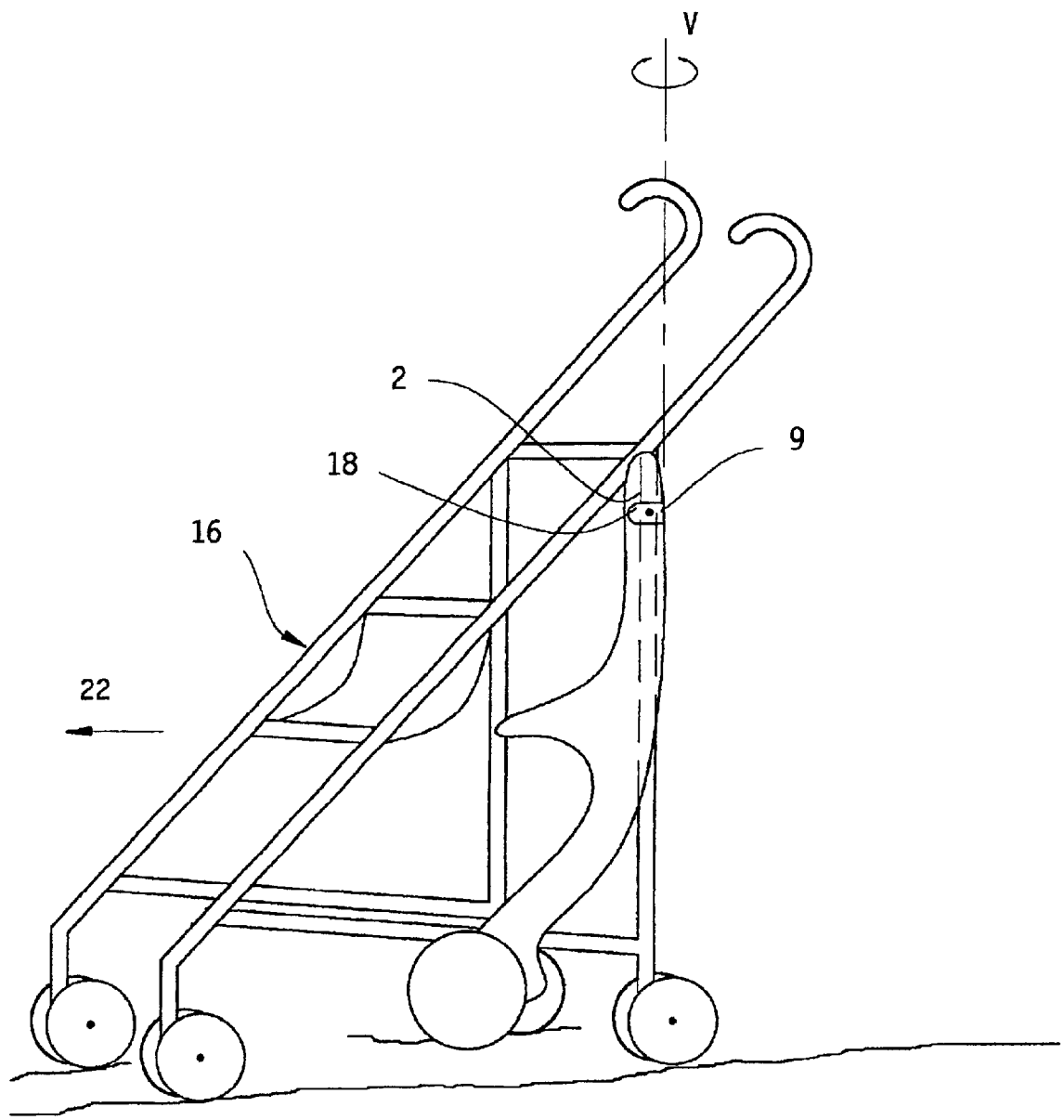
FIG. 3 is a view of the invented trailer in a static position.

This allows the unoccupied trailer to be swivelled adjacent to the stroller 16 and parallel to the stroller 16 along the axis V into a static position. This allows the trailer to be transported easily when not in use. The static position of the trailer 16 when it is not in use is shown in FIG. 3.

A mounting, which is not described in detail here, is used to secure the trailer in the static position.

The pivot point of the second joint 12 is on the side of the coupling device aligned with the stroller.

Figure 6A:
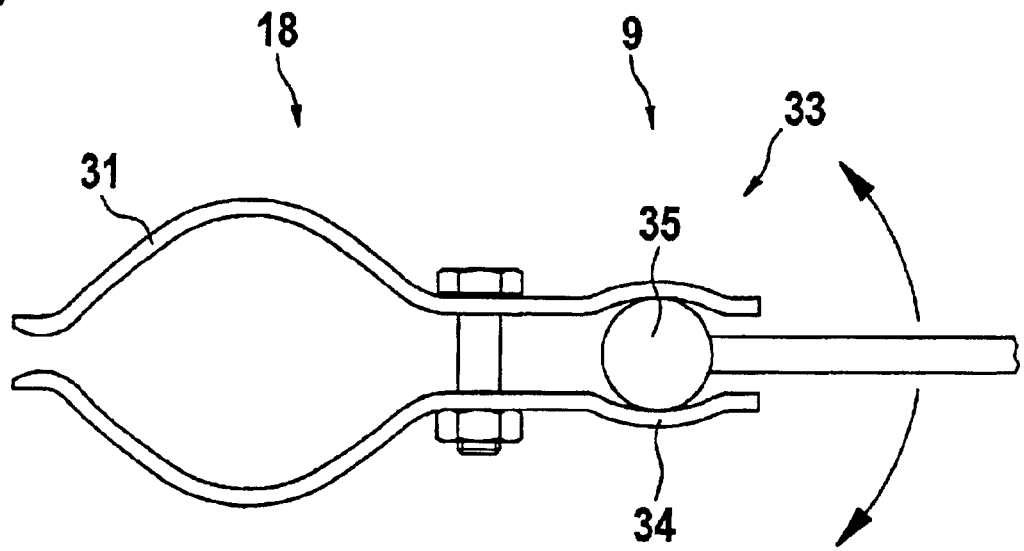
FIGS. 6a and 6b are schematic drawings of a universal joint in the form of a ball joint.
Figure 6B:
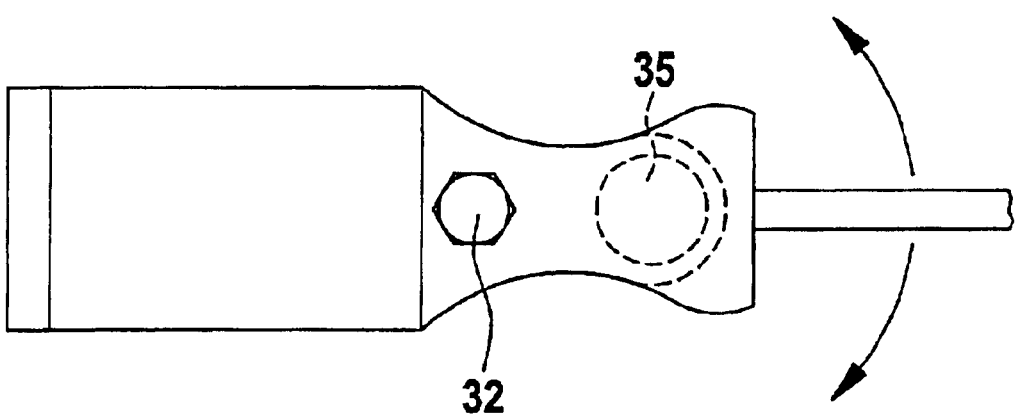

According to FIGS. 6a and 6b attachment assembly 18 comprises a clamping-device 31 with a screw 32 to be connected to the frame of a baby carriage. The attachment assembly 18 comprises also a ball-joint having a ball 35 which is movable in the holder 34, both laterally and vertically.

Figure 7A:
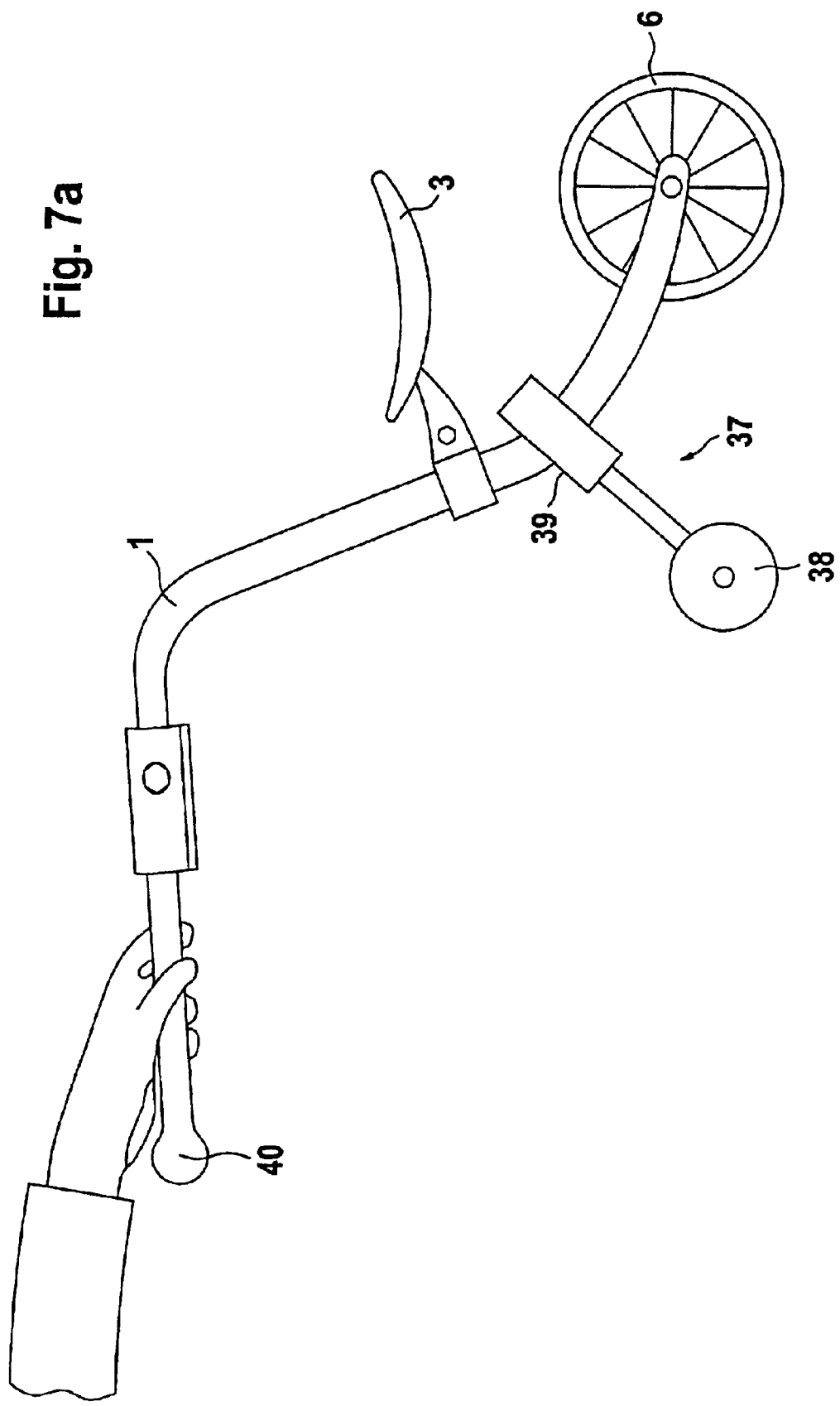
FIGS. 7a and 7b show a further embodiment of a trailer in accordance with the invention in a side-view and view from the back and FIG. 7c shows the attachment assembly of FIG. 7a connected to a ball joint.
Figure 7B:
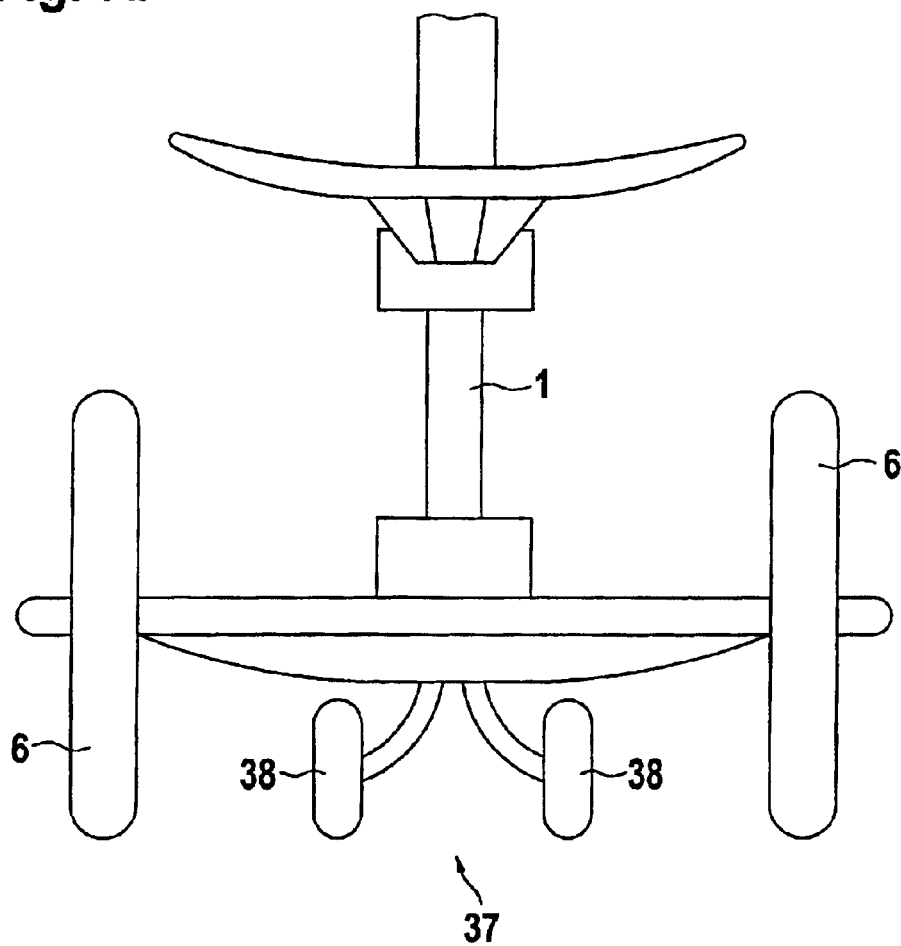

According to FIG. 7a, a front-wheel assembly 37 may be connected to frame 1. Front-wheel assembly 37 comprises two wheels 38 to improve stability. However, front-wheel assembly 37 may comprise only one wheel, also.

Front-wheel assembly 37 is attached to frame 1 by clamping screw 39 to make the assembly detachable.

A shown in FIG. 7a a holder 40 is connected to frame 1. An adult person may take holder 40 and carry or draw the trailer after separating it from the baby carriage. This is particularly convenient, when the front-wheel assembly 37 is attached to frame 1.

Figure 7C:
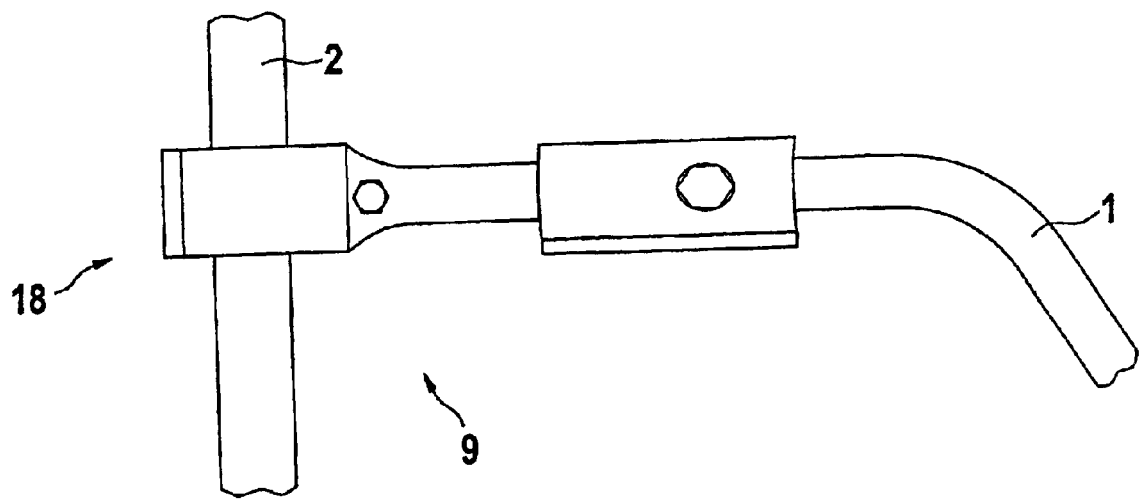

As shown in FIG. 7c, instead of holder 40, attachment assembly 18 may be attached, to connect frame 1 of the trailer to frame 2 of the baby carriage.

I claim:

1. A trailer designed to carry at least one child, said trailer being attachable to a frame (2) of a stroller (16), said trailer comprising a chassis (6) having at least one wheel (19), a frame (1), a seat (3), at least one handle (5), at least one foot rest (20) and a coupling device (9) comprising an attachment assembly (18) to be attached to the frame (2) of the stroller (16), said coupling device allowing the trailer to swivel in at least two directions in relation to the stroller and at least a first joint (11) and a second joint (12), said coupling device being designed in such a way that said trailer is culled laterally behind the stroller.

2. A trailer according to claim 1, wherein the handle (5) and the seat (3) are located in a superimposed position in relation to the chassis (6) so that the child can be carried while sitting in an upright position.

3. A trailer according to claim 1, wherein the handle (5) is positioned in the direction of travel (22) of the stroller (16) in front of the chassis (6) so that a connecting line (17) runs between the chassis (6) and the handle (5) at an angle in the vertical perspective of less than 45° when the trailer is mounted.

4. A trailer according to claim 3, wherein the connecting line (17) runs between the chassis (6) and the handle (5) at an angle of between 35°–40°.

5. A trailer according to claim 3, wherein the attachment assembly (18) is designed to be positioned above the height of the seat (3).

6. A trailer according to claim 5, wherein the attachment assembly (18) is located above the handle (5).

7. A trailer according to claim 3, wherein the attachment assembly (18) is located at a height approximately equivalent to the height of the handle (5).

8. A trailer according to claim 1, wherein the seat (3) is designed to incline inwards in an opposed position to the direction of travel (22) of the stroller.

9. A trailer according to claim 1, wherein the position of the seat (3) corresponds to half of the overall height of the trailer.

10. A trailer according to claim 1, wherein the height of the seat (3), the handle (5) and/or the foot rest (20) can be adjusted.

11. A trailer according to claim 1, wherein the length of the seat (3) is designed to accommodate at least one child.

* * * * *